C. F. SCOTT.
ELECTRICAL TRANSMISSION OF POWER.
No. 515,885. Patented Mar. 6, 1894.
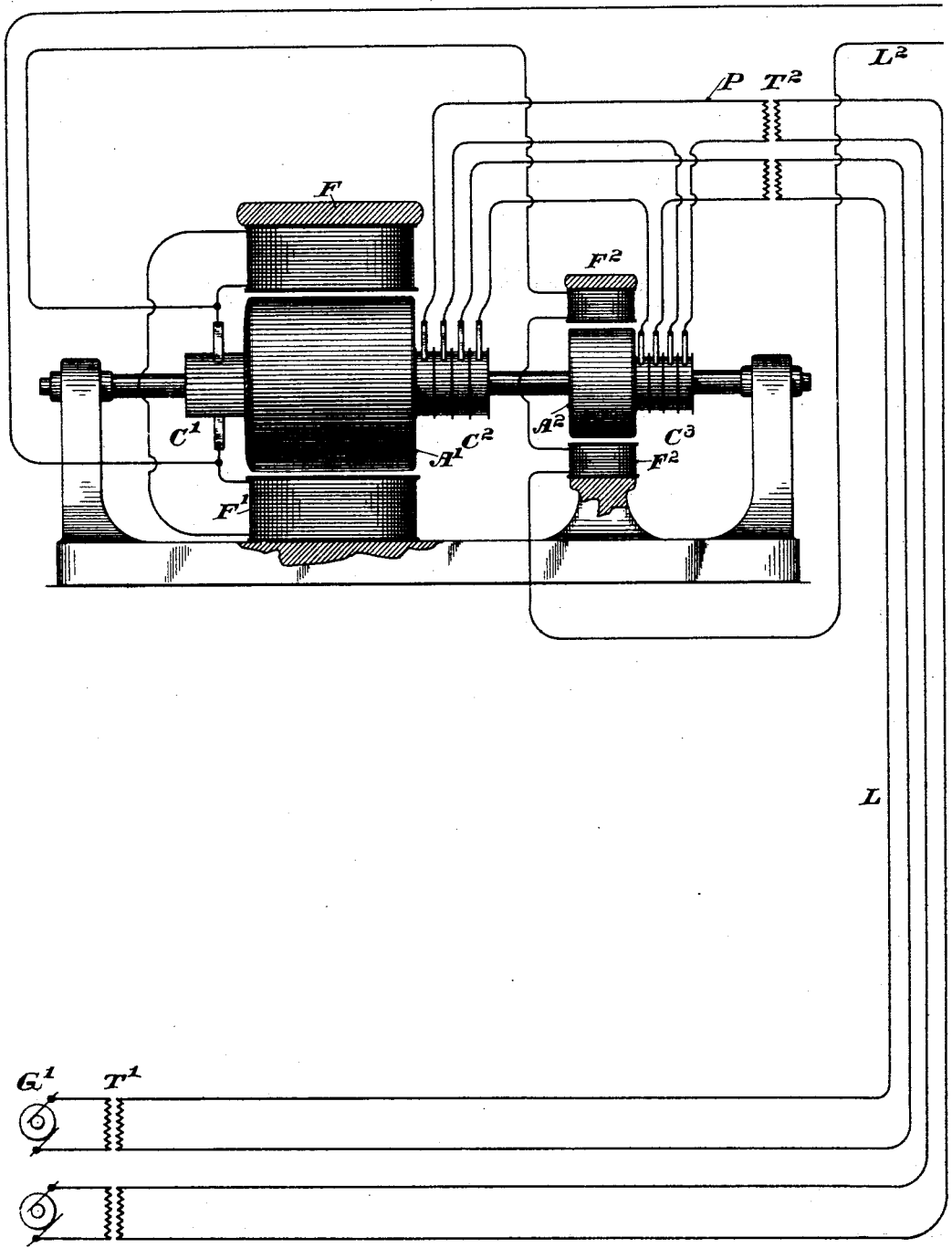

UNITED STATES PATENT OFFICE.

CHARLES F. SCOTT, OF PITTSBURG, PENNSYLVANIA, ASSIGNOR TO THE WESTINGHOUSE ELECTRIC AND MANUFACTURING COMPANY, OF SAME PLACE.

ELECTRICAL TRANSMISSION OF POWER.

SPECIFICATION forming part of Letters Patent No. 515,885, dated March 6, 1894.

Application filed March 27, 1893. Serial No. 467,867. (No model.)

*To all whom it may concern:*

Be it known that I, CHARLES F. SCOTT, a citizen of the United States, residing in Pittsburg, in the county of Allegheny and State of Pennsylvania, have invented a new and useful Improvement in Electrical Transmission of Power, (Case No. 541,) of which the following is a specification.

My invention has relation to systems of distribution of direct, intermittent, undulatory or alternating electric currents, supplied by a central constant potential source; and to a method and means whereby the energy of such a source may be utilized at various points at a transformed potential, and whereby such transformed potential may be preserved constant.

Where a central source of current is employed to feed translating devices at various points in multiple arc, it is essential that the current delivered should be preserved at a constant potential at the points of delivery. In systems of distribution involving transformation of potential at the points of delivery, by means of motor-generators, much difficulty has been hitherto experienced in keeping the transformed current at a constant potential. It is the object of my present invention to supply means whereby this may be accomplished in a reliable manner; and to adapt such means to either alternating or direct current systems.

In describing my invention herein I shall indicate that modification of my invention which is adapted to alternating current systems, and particularly to multiphase systems.

The accompanying drawing illustrates my invention, and is a diagrammatic representation of the various essential parts of a system of distribution for transformation by motor generators, adapted to alternate currents of two or more phases.

In the drawing G' and $G^2$ represent the rings of a two phase constant potential alternate current generator.

At T' is shown the usual "step up" converter, for supplying the line, and at $T^2$ is shown the "step down" converter employed at points where translation of energy occurs. These converters may be of any desired type, and indeed may be entirely dispensed with, if desired. The main line, consisting in the instance shown of four wires, is shown at L.

A' is the armature, and F' the field magnet of a motor generator, receiving current from the line by means of the collecting rings, 5, 6, 7 and 8. The generator element of this machine delivers a direct current in the instance shown, through the commutator, C', to the line $L^2$. The field magnet of the motor generator is shown as excited by a shunt circuit from the armature A', but, if desired it might be separately excited.

As the motor generator and the main dynamo G', $G^2$, run in synchronism, the speed of the former will be practically independent of the load, and the counter electromotive force in the armature of the motor element thereof will be practically proportional to the strength of the field magnet F'. Supposing the motor-generator to be running, and to be supplying translating devices, say lamps, across the mains $L^2$. Now if more lamps are at any time thrown into the circuit, the extra current called for will act to decrease the pressure at the terminals, or commutator C'. But it is usually necessary either to keep this potential constant, or to increase it in order to keep the pressure constant at the lamps. In order to accomplish this the ordinary course is to increase the strength of the field magnet F'. But it is evident that this course will proportionately increase the counter-electromotive force in the armature of the motor element of the motor-generator. But since this counter electromotive force is designedly kept practically equal to the impressed electromotive force, such a rise in counter electromotive force would cause a back pressure on the alternating current circuit, which is designed to be kept constant. It is to avoid this difficulty that I have devised the construction shown in the drawing.

In the practice of my invention, I supply a reinforcing generator, the field magnets of which are in the circuit fed by the motor generator, and the armature of which is in series with the armature of the motor element of the motor-generator. Thus the electromotive force added to the driving electromotive force by this supplementary dynamo, is dependent upon the strength of the current delivered by the motor-generator, and thus the rise in counter electromotive force in this last member is compensated for.

The armature of the reinforcing generator is shown at $A^2$, and the field magnet at $F^2$. This dynamo is driven by any motor running synchronously with the main dynamo and the motor generator; but preferably by said motor-generator itself, as shown. The field coils $F^2$ are in series with the mains $L^2$, and the armature coils are in series with the driving current and the armature of the motor-generator. The armature coils $A^2$ are put thus in series by means of the rings 1, 2, 3 and 4, to which are attached the respective terminals of the coils $A^2$, and upon which bear brushes connected with the secondaries of the converters $T^2$. As may be seen from inspection of the drawing, the current in passing from these secondaries, reaches the armature of the motor member of the motor-generator through the coils of the armature $A^2$. Thus the electromotive force generated in this last named armature is added to that delivered at the secondary terminals; and as before stated, this additional electromotive force is proportional to the strength of the current delivered to the mains $L^2$.

It is evident that, if desired, two of the rings $C^2$ and two of the rings $C^3$ may be omitted. The ring 2 being directly connected to the ring 7, and ring 4 with ring 5; these may be omitted, and simple connections through the shaft, may be placed between the armature terminals proper to be connected. Of course this is only possible when the reinforcing generator is driven by the motor-generator, and when the armatures are on the same shaft.

Supposing now that lamps are thrown into the circuit $L^2$, and the current delivered by the motor-generator thus increased. The field magnet $F'$ being strengthened in the usual manner, the counter electromotive force of the armature in the motor member of the motor-generator is increased; but, at the same time, the direct impressed electromotive force is proportionately increased by the added force of the dynamo $A^2$, and the increase of counter electromotive force thus entirely compensated for.

It is evident that the method and apparatus above described are perfectly applicable in their essential features to direct current distribution, or to alternate currents of more or less than two phases. Moreover any type of motor-generator may be employed, either having two distinct members, or wherein the same armature acts as motor and as generator. Again, the mains $L^2$ may be fed with alternating current, in which case a special commutator would be necessary to feed the field magnets $F'$ and $F^2$.

I claim as my invention—

1. A main generator, a motor generator driven thereby, and a circuit fed by the latter; in combination with a supplementary generator the field magnet strength of which is controlled by the current from the motor generator, and the electromotive force of which is added to that of the main generator.

2. A main generator, a motor-generator, and a circuit fed by the latter; in combination with a supplementary generator having its field magnets in the circuit fed by said motor-generator, and its armature in series with the armature of the motor element of said motor-generator, substantially as described.

3. A main generator, a motor-generator, and a circuit fed by the latter; in combination with a supplementary generator having its field magnets in the circuit fed by said motor-generator, and its armature in series with the armature of the motor element of said motor-generator, the armature of said supplementary generator, being driven by said motor generator, substantially as described.

4. A main generator, a motor-generator, and a circuit fed by the latter; in combination with a supplementary generator having its armature on the same shaft with that of said motor-generator, its field magnets in series with the circuit fed by said motor-generator, and its armature coils in series with the coils of the armature of the motor element of said motor generator, substantially as described.

5. A main alternating current dynamo, an alternating current motor generator driven thereby, and a circuit fed by said motor-generator; in combination with a supplementary dynamo having collecting rings in the main dynamo circuit and its armature coils in series with said circuit and with the armature of the motor element of the motor generator, the field magnet of said supplementary dynamo being in series with the circuit fed by the motor-generator, substantially as described.

6. A main alternating current dynamo, an alternating current motor-generator driven thereby, and a circuit fed by said motor-generator; in combination with a supplementary dynamo having collecting rings in the main dynamo circuit and its armature coils in series with said circuit and with the armature of the motor element of the motor-generator, said supplementary dynamo being driven by the motor generator, and the field magnet of said supplementary dynamo being in series with the circuit fed by the motor generator, substantially as described.

7. A main alternating current multiphase dynamo, circuits therefrom, and a multiphase motor-generator driven by said circuits; in combination with a supplementary multiphase alternating current dynamo, having its armature in series between the main dynamo and the armature of the motor element of said motor-generator, said armature being driven by said motor-generator, and the field magnet of said supplementary dynamo being in series with the circuit fed by said motor-generator, substantially as described.

In testimony whereof I have hereunto subscribed my name this 24th day of March, A. D. 1893.

CHAS. F. SCOTT.

Witnesses:
JAMES WM. SMITH,
HAROLD S. MACKAYE.